US012662034B2

(12) United States Patent      (10) Patent No.:    US 12,662,034 B2

Soltner                  (45) Date of Patent:      Jun. 23, 2026

(54) ADJUSTING DEVICE FOR A HEADREST OF A VEHICLE SEAT AND VEHICLE SEAT

(71) Applicant: Faurecia Autositze GmbH, Hannover (DE)

(72) Inventor: Stephane Soltner, Mailleroncourt Charette (FR)

(73) Assignee: Faurecia Autositze GmbH, Hannover (DE)

( * ) Notice: Subject to any disclaimer, the term of this patent is extended or adjusted under 35 U.S.C. 154(b) by 365 days.

(21) Appl. No.: 18/234,991

(22) Filed: Aug. 17, 2023

(65) Prior Publication Data

US 2024/0059200 A1     Feb. 22, 2024

(30) Foreign Application Priority Data

Aug. 19, 2022    (DE) ..................... 10 2022 120 969.5

(51) Int. Cl.
     *B60N 2/865*        (2018.01)
     *B60N 2/829*        (2018.01)

(52) U.S. Cl.
     CPC ............. *B60N 2/865* (2018.02); *B60N 2/829* (2018.02)

(58) Field of Classification Search
     CPC ................................ B60N 2/865; B60N 2/829
     See application file for complete search history.

(56) References Cited

U.S. PATENT DOCUMENTS

| | | | | |
|---|---|---|---|---|
| 2005/0127726 A1* | 6/2005 | Schilling | ................ | B60N 2/862 |
| | | | | 297/216.12 |
| 2013/0049430 A1* | 2/2013 | Sobieski | ................ | B60N 2/865 |
| | | | | 297/410 |
| 2013/0229042 A1* | 9/2013 | Kotz | ..................... | B60N 2/888 |
| | | | | 297/391 |
| 2015/0130247 A1* | 5/2015 | Kondrad | ................ | B60N 2/865 |
| | | | | 297/410 |
| 2015/0329023 A1* | 11/2015 | Ishihara | ................. | B60N 2/865 |
| | | | | 297/406 |

(Continued)

FOREIGN PATENT DOCUMENTS

| | | |
|---|---|---|
| CN | 113525205 A | 10/2021 |
| DE | 8717434 U1 | 10/1988 |

(Continued)

*Primary Examiner* — David R Dunn
*Assistant Examiner* — Jessica Kathryn Thompson
(74) *Attorney, Agent, or Firm* — Barnes & Thornburg LLP

(57)          ABSTRACT

The present disclosure relates to an adjusting device for a headrest of a vehicle seat, the adjusting device comprising: a backrest fastening for attaching to a backrest, a holding device with a vertical adjustment means for adjusting the headrest in vertical direction, a longitudinal adjusting means for adjusting the holding device in a longitudinal direction, the longitudinal adjusting means comprising a four-joint gear provided between the backrest fastening and the holding device, the four-joint gear comprising two guiding arms. Here, the longitudinal adjusting means comprises a spindle drive, the spindle drive being provided between the holding device and one of the guiding arms. The guiding arm is preferably a front guiding arm. A spindle of the spindle drive is preferably translationally displaceable and provided in an arc-shaped slot guiding of the guiding arm. Moreover, a vertical adjustment by a second spindle drive is provided.

15 Claims, 3 Drawing Sheets

(56) References Cited

U.S. PATENT DOCUMENTS

| | | | | |
|---|---|---|---|---|
| 2022/0258656 A1* | 8/2022 | Little | ..................... | B60N 2/815 |
| 2023/0202369 A1* | 6/2023 | Kim | ...................... | B60N 2/885 |
| | | | | 297/391 |

FOREIGN PATENT DOCUMENTS

| | | | |
|---|---|---|---|
| DE | 102017108801 | A1 | 11/2017 |
| EP | 2698277 | B1 | 3/2016 |
| EP | 3372445 | B1 | 9/2018 |

* cited by examiner

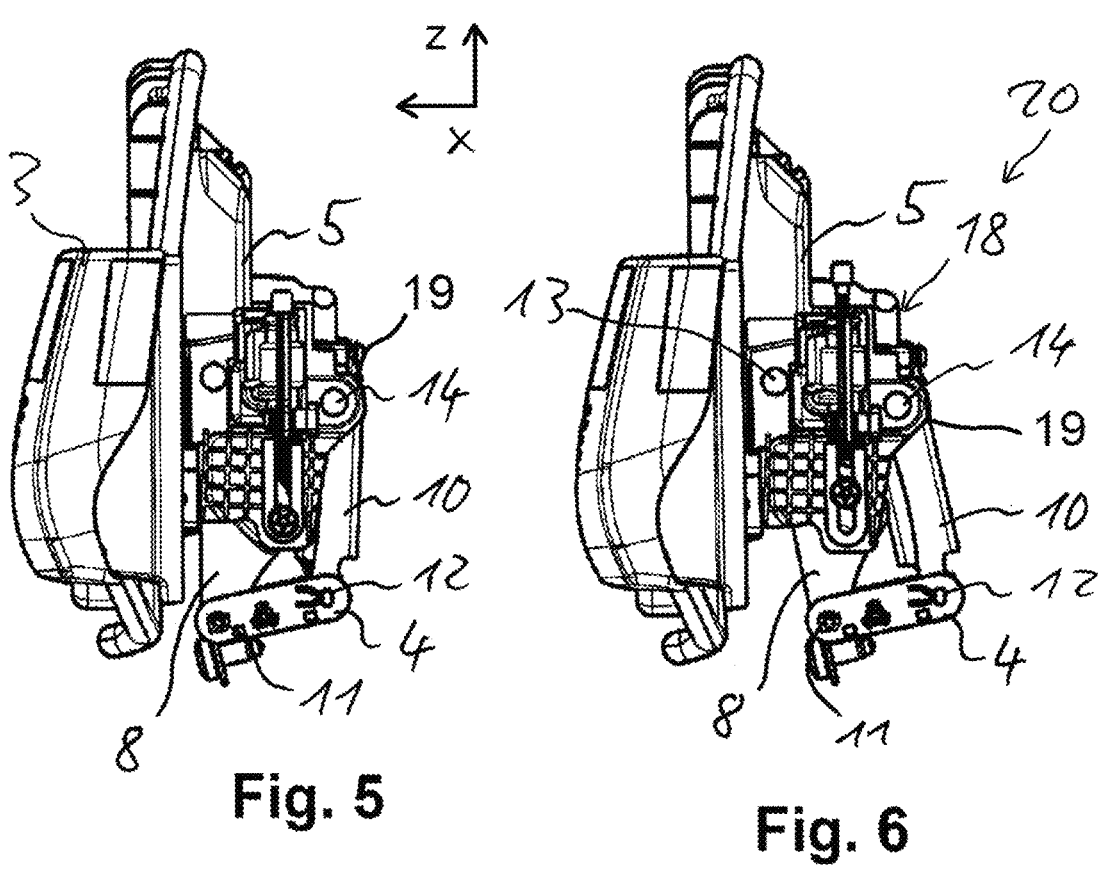
Fig. 5
Fig. 6
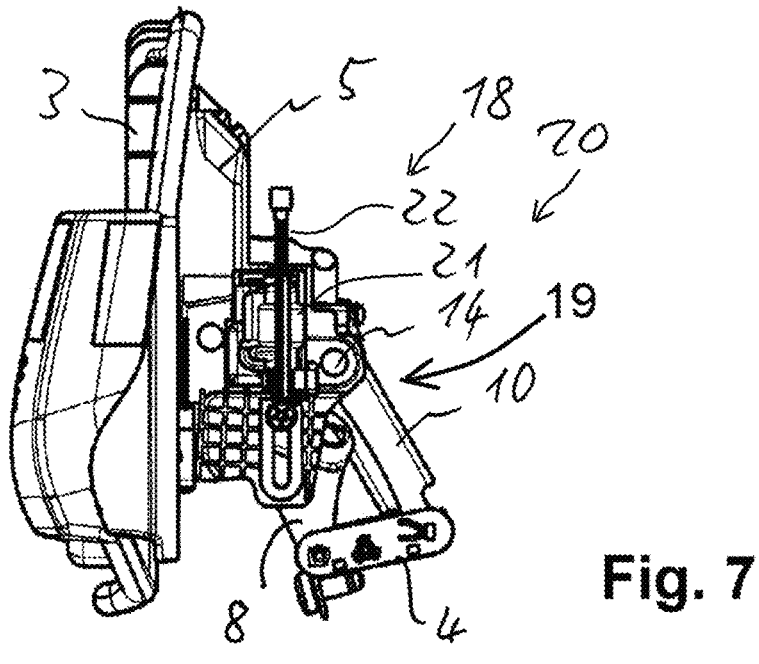
Fig. 7

ADJUSTING DEVICE FOR A HEADREST OF A VEHICLE SEAT AND VEHICLE SEAT

PRIORITY CLAIM

This application claims priority to German Patent Application No. DE 10 2022 120 969.5, filed Aug. 19, 2022, which is expressly incorporated by reference herein.

BACKGROUND

The present disclosure relates to an adjusting device for a headrest of a vehicle seat and such a vehicle seat.

SUMMARY

According to the present disclosure, a holding device is provided, in particular as a holding plate, which is attached to a backrest fastening of the backrest via a longitudinal adjusting means. The headrest is vertically adjustable relative to the holding device, so that together a free adjusting in the xz-plane is possible. The longitudinal adjusting means has a four-joint gear, i.e. a four-joint mechanism, and a spindle drive. The four-joint-gear mechanism provides a secure guiding with a degree of freedom that adjusts the holding device in longitudinal direction or X-direction. The spindle drive provides self-locking, a compact design with low weight as well as high reduction ratio.

By connecting the spindle drive between the holding device and a guiding arm, in particular the front guiding arm, favourable swivel kinematics and suitable reduction are achieved, as well as high strength and crash safety. Preferably, the spindle drive is mounted on the holding device, in particular fixed on it, and the spindle is guided in a suitable cam guiding of the front guiding arm. The spindle drive in combination with the cam guiding in the front guiding arm enables a suitable conversion of the linear adjusting of the spindle into the pivoting motion of the four-joint gear. As the spindle acts in translation and is loaded forwards during longitudinal adjusting, a high degree of strength is achieved when loaded by the head of a seat occupant.

Thus, the holding device can be adjusted in the longitudinal direction, generally in a pivoting motion with a superimposed vertical adjusting. Hereby, in particular, the front and rear guiding arms of the four-joint mechanism can be of unequal length, e.g. with a lower front guiding arm, so that higher rigidity or strength is achieved than, for example, with a parallel guide linkage or parallelogram guiding. Such a four-joint-system also provides a rattle-free and firm mounting with high crash safety.

In addition, preferably a guiding means for the lower spindle end or spindle head of the spindle is provided in the holding device, whereby loads on the spindle, in particular in X direction, can at least be reduced. Thus, the spindle head on the one hand slides in an e.g. arc-shaped slot guiding of the front guiding arm, and is further guided in the guiding means of the holding device. The guiding means can be formed in particular by a vertical recess or a vertical slot. A particularly good design of the guide can be provided by a freely rotating gear wheel mounted on the spindle head and meshing in a toothing of the recess, in particular a vertical longitudinal toothing. This design thus advantageously serves as a guide for the spindle end and not as a driven wheeltooth gear. The guiding can be provided in particular on both sides—left and right—whereas the spindle drive of the longitudinal adjusting is provided, for example, only on one side. Due to the identical guiding means provided on both sides, a high synchronization of the guides can be achieved.

Due to the relatively low effort of the additional guiding means, a very high load capacity and protection against forces in X-direction can be achieved, and jamming can be prevented. The exact shape of the slot in the guiding arm and the guiding of the spindle in the holding device can be adapted to the desired adjusting, as can the positions and shapes of the two guiding arms, resulting in a high degree of design freedom.

In illustrative embodiments, the adjusting in the vertical direction is also motorized, in particular again as a spindle drive, which is therefore self-locking and thus provides a high level of crash safety and safety against inertial forces.

The vertical adjusting is preferably provided between the holding device and the headrest or a headrest support. Thus, both spindle motors can be received on the holding device and effectively soundproofed from the outside, which offers in particular advantages over alternative solutions with motors in side areas of the headrest.

In illustrative embodiments, the spindles of both adjustings run vertically or uprightly, so that a space-saving design is achieved, which allows for a compact design of the entire adjusting device, with high safety and low weight. According to a preferred embodiment, the two spindle motors of the adjustings are equal, which allows for a reduced number of parts, and a common control in one interface. Here, for example, the spindles can be of unequal length, e.g. with a longer spindle of the vertical adjusting means and shorter spindle of the longitudinal adjusting means.

The spindle of the longitudinal adjusting means and/or the second spindle of the vertical adjusting means can be flexible, i.e. in particular bendable. This works to particular advantage with the design in which the spindle of the longitudinal adjusting means is loaded by forwards longitudinal adjusting, since the high forces to the front can be absorbed by the flexible spindle as a tensile force, and for the lower forces to the rear the flexible design of the spindle is sufficient to absorb the occurring shear forces.

Accordingly, a vehicle seat is created that provides safe and simple, space-saving, cost-effective and well-silenced motorized adjusting and thus a high comfort.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 5 shows the adjusting device in a back position;

FIG. 6 shows the adjusting device of FIG. 5 in a longitudinal mid position;

FIG. 7 shows the adjusting device in a longitudinal front position;

DETAILED DESCRIPTION

Figures 1, 2, 3, 4:
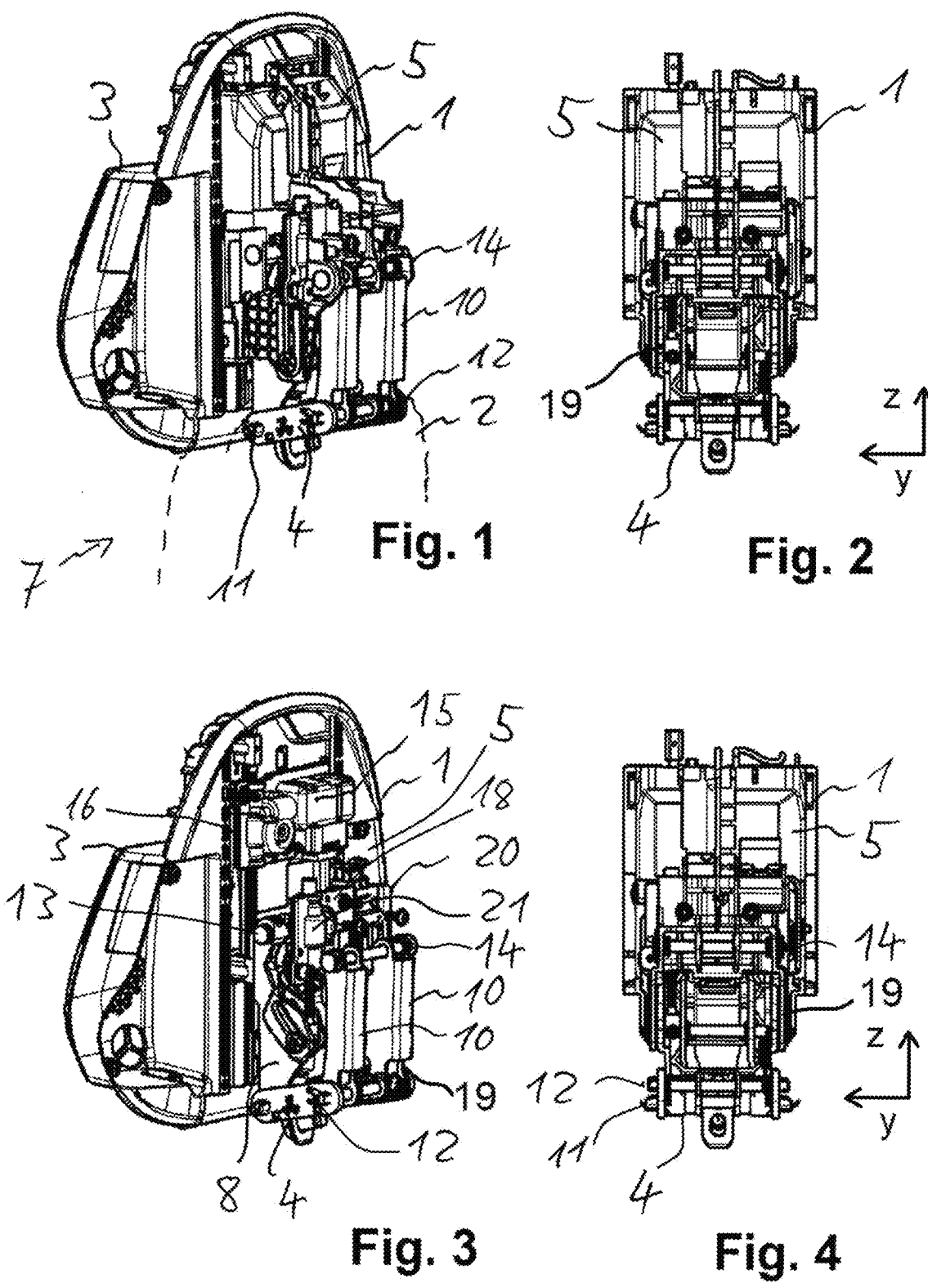
FIG. 1 shows an adjusting device according to an embodiment, with a headrest.
FIG. 2 shows a back view of the adjusting device of FIG. 1.
FIG. 3 shows the adjusting device of FIG. 1 without cover.
FIG. 4 shows a back view of FIG. 3.

An adjusting device 1 is provided between a backrest 2, which is schematically depicted in FIG. 1, and a headrest 3. In the figures, the headrest 3 is in particular depicted by its headrest carrier. The adjusting device 1 serves for adjusting the headrest 3 relative to the backrest 2 in longitudinal direction, e.g. X direction, as well as in vertical direction, e.g. Z direction. In order to realize these displacements, the adjusting device 1 comprises a backrest fastening 4 for mounting it onto the backrest 2, and a holding device 5, in particular a holding plate. The holding device 5 is displaceable in longitudinal direction X relative to the backrest fastening 4, by means of a longitudinal adjusting means 20; further, the headrest 3 is displaceable in vertical direction Z relative to the holding device 5.

The longitudinal adjusting means 20 is motor-driven, comprising a four-joint gear 19 (four-joint transmission) provided between the backrest fastening 4 and the holding device 5, and a spindle drive 18. The four-joint transmission 19 is realized by a longer front guiding arm 8 and a shorter rear guiding arm 10. This pair of guiding arms is preferably provided on both sides, i.e. the right side and the left side, respectively, in order to provide for a high stability in cross direction (Y direction); thus, two parallel front guiding arms 8 and two parallel rear guiding arms 10 are provided, as is evident from FIGS. 2 and 4.

The front arm 8 is pivotably jointed to the backrest fastening 4 in a lower front joint 11, and to the holding device 5 in an upper front joint 13; accordingly, the rear guiding arm 10 is pivotably mounted/jointed to the backrest fastening 4 in a lower back joint 12, and to the holding device 5 in an upper back joint 14. The guiding arms 8, 10 are preferably of different lengths, in order to obtain a high stability and to avoid rattling or rattling noise. In the very back position of FIG. 5, the guiding arms 8, 10 extend substantially vertically.

Figures 8, 9, 10, 11:
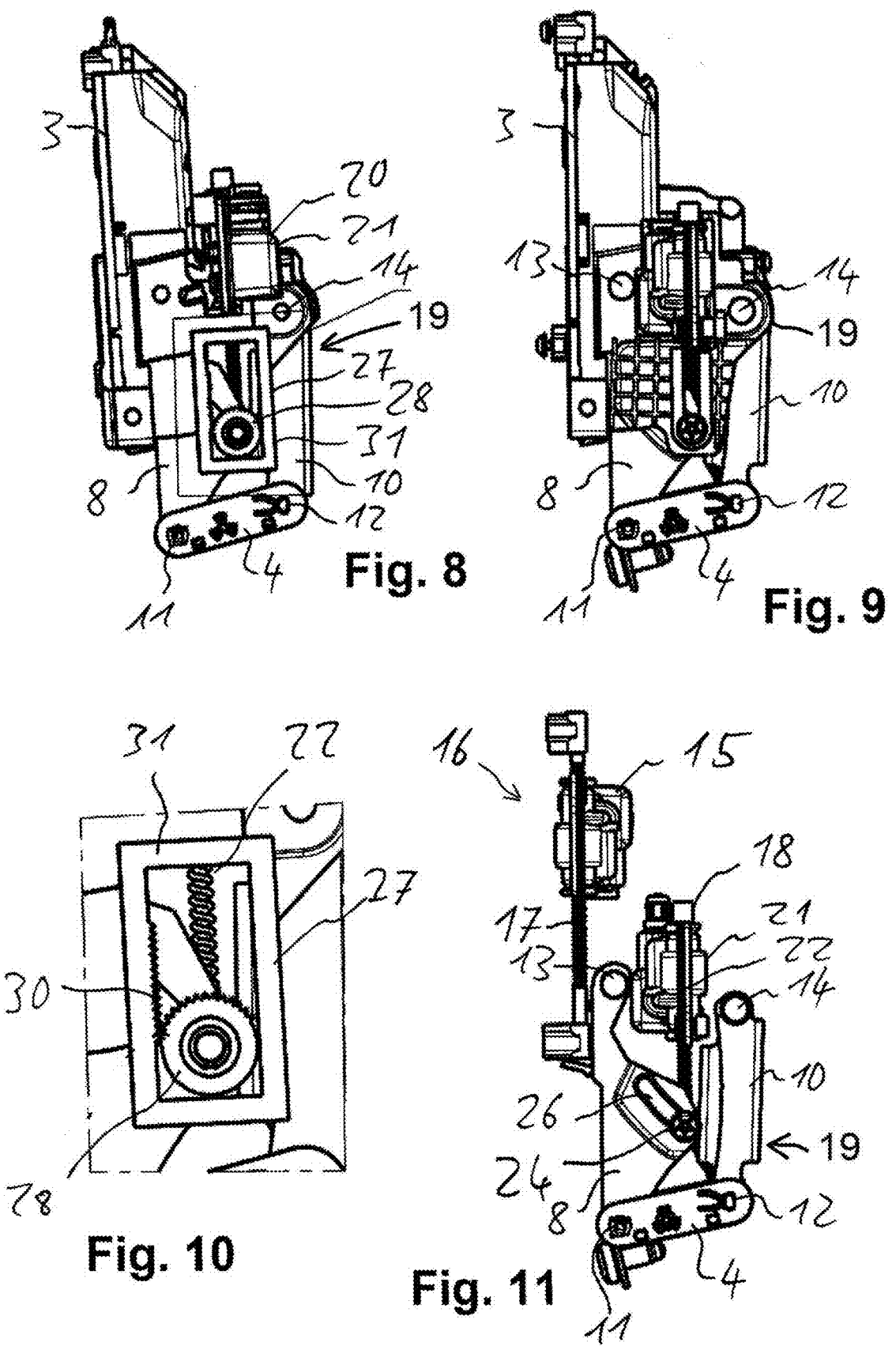
FIG. 8 shows an embodiment with a guiding means with toothed wheel and vertical toothing.
FIG. 9 shows the arrangement of FIG. 8 without spindle drive.
FIG. 10 shows detail A in FIG. 8.
FIG. 11 shows elements of the adjusting device of FIGS. 5 and 8, with both spindles and guiding arms.

For the vertical displacement of the headrest 3, a vertical adjustment means 16 is provided, as is evident from FIG. 11, wherein the vertical adjustment means 16 is preferably a vertical spindle drive 16 (second spindle drive 16). The vertical spindle drive 16 enables a displacement of the headrest 3 in vertical direction z relative to the holding device 5.

The spindle drive 18 of the longitudinal adjusting means 20 comprises a spindle motor 21 received on or in the holding device 5, wherein the spindle motor 21 displaces a vertically extending spindle shaft 22 translationally.

A spindle head 24 is provided at the end of the spindle shaft 22, the spindle head 24 being received in a cam guiding 26, which is an arc-shaped slot guiding 26, the cam guiding being provided in the front guiding arm 8 and extends forwards and upwards, as evident from FIG. 11. Thus, starting from the very back position of FIGS. 5, 8 and 12, a displacement of the holding device 5 in longitudinal direction X forwards is realized by the spindle head 24 sliding in the arc-shaped slot 26 forwards. During this forwards displacement, in which a user in general exerts a higher force onto the headrest 3, the spindle shaft 22 is tensioned and pulled upwards. During the back adjustment rearwards, e.g.

in –X direction, the force of the head of the user in general supports this movement, and thus, the spindle shaft 22 is loaded by thrust.

However, reverse embodiments of the longitudinal adjusting device 20 are possible, in which the spindle shaft 22 is loaded by thrust when being displaced in forwards direction.

Thus, a flexible spindle shaft 22 can be used, which is strained when receiving the higher forces of the forwards displacement, and which is sufficient for receiving the lower forces of the back displacement.

The spindle head 24 is further guided in the holding device 5: As is evident from detail A in FIG. 10, a toothed wheel 28 is provided or beared in the spindle head 24, wherein the toothed wheel 28 is not driven by the spindle shaft 22. In the vertical displacement of the spindle head 24, the toothed wheel 28 meshes with a straight toothing 30, which is formed in the holding device 5. According to FIG. 10, the holding device 5 preferably comprises a recess, in particular a window 31, in which the straight toothing 30 is formed. The vertical extension of the straight toothing 30, which is about 25 mm, corresponds to the stroke of the spindle shaft 22 during the longitudinal displacement. As is evident from FIG. 10, the toothing of the toothed wheel 28 in general does not extend along the whole circumference, but only on a part of its circumference. By these toothings, a safe guiding of the spindle head 24 at the lower end of the spindle shaft 22 is realized, and thereby, the forces and torques or bending moments pushing onto the front guiding arm 8 in longitudinal direction X can be beared. In particular, torques and bending forces acting in cross direction (Y direction) can be received reliably.

Starting from the very back position of FIG. 5, a displacement of X=20 mm into the mid position of FIG. 6, and a total displacement of X=40 mm into the foremost position of FIG. 7 is provided.

The second spindle drive 15 of the vertical displacement means 16 is preferably received in the holding device 5, and displaces a second spindle shaft 17 translationally. The second spindle shaft 17, like the first spindle shaft 22, extends in vertical direction Z and therefore, both spindle drives can be received and provided compactly. The spindle motors 15 and 21 are preferably equal and work translationally; the spindle shaft 17 of the vertical adjustment means 16 is in general longer than the spindle shaft 22 of the longitudinal displacement means 20.

The guiding means 27 of FIG. 10 is preferably provided on both sides, e.g. on the left side and the right side, in identical manner; therefore, even with the spindle drive 18 being provided on only one side, the guiding means 27 provides a safe, smooth and uniform guiding. Thus, an advantageous synchronization of the left and right side is possible by using only one spindle drive on one of both sides.

The holding device 5 forms a casing for receiving both motors, the spindle motor 15 of the vertical displacement means 16 as well as the spindle motor 21 of the longitudinal adjusting means 20. Both adjusting means 16 and 20 can therefore be received in the same holding device 5. The spindle motors 15 and 21 are preferably provided in a mid section, and therefore, an advantageous sound absorption is possible, which is problematic in motors provided in side regions of the headrest.

Both spindle drives are self-locking and self-inhibiting and therefore, no further locking or interlocking is necessary; however, such an additional locking is possible.

The present disclosure relates to an adjusting device for a headrest of a vehicle seat and such a vehicle seat.

A comparative adjusting device which allows for a manual adjusting of the headrest relative to the backrest, and therefore enables an individual adjusting to the seat occupant.

However, manual adjustings are sometimes more difficult to perform and do not meet the comfort functions of motorized adjustings. Furthermore, locking and unlocking are sometimes time-consuming for the user. For motorized adjustings, however, the available installation spaces are often insufficient; furthermore, sound insulation of the motors is often difficult.

The present disclosure is based on the object to create an adjusting device for a headrest and a vehicle seat comprising such an adjusting device, which enable safe adjustment with low effort and low installation space.

This object is solved by an adjusting device in accordance with the present disclosure. Further, a vehicle seat with such an adjusting device is provided.

Thus, a holding device is provided, in particular as a holding plate, which is attached to a backrest fastening of the backrest via a longitudinal adjusting means. The headrest is vertically adjustable relative to the holding device, so that together a free adjusting in the xz-plane is possible. The longitudinal adjusting means has a four-joint gear, i.e. a four-joint mechanism, and a spindle drive. The four-joint-gear mechanism provides a secure guiding with a degree of freedom that adjusts the holding device in longitudinal direction or X-direction. The spindle drive provides self-locking, a compact design with low weight as well as high reduction ratio.

By connecting the spindle drive between the holding device and a guiding arm, in particular the front guiding arm, favourable swivel kinematics and suitable reduction are achieved, as well as high strength and crash safety. Preferably, the spindle drive is mounted on the holding device, in particular fixed on it, and the spindle is guided in a suitable cam guiding of the front guiding arm. The spindle drive in combination with the cam guiding in the front guiding arm enables a suitable conversion of the linear adjusting of the spindle into the pivoting motion of the four-joint gear. As the spindle acts in translation and is loaded forwards during longitudinal adjusting, a high degree of strength is achieved when loaded by the head of a seat occupant.

Thus, the holding device can be adjusted in the longitudinal direction, generally in a pivoting motion with a superimposed vertical adjusting. Hereby, in particular, the front and rear guiding arms of the four-joint mechanism can be of unequal length, e.g. with a lower front guiding arm, so that higher rigidity or strength is achieved than, for example, with a parallel guide linkage or parallelogram guiding. Such a four-joint-system also provides a rattle-free and firm mounting with high crash safety.

In addition, preferably a guiding means for the lower spindle end or spindle head of the spindle is provided in the holding device, whereby loads on the spindle, in particular in X direction, can at least be reduced. Thus, the spindle head on the one hand slides in an e.g. arc-shaped slot guiding of the front guiding arm, and is further guided in the guiding means of the holding device. The guiding means can be formed in particular by a vertical recess or a vertical slot. A particularly good design of the guide can be provided by a freely rotating gear wheel mounted on the spindle head and meshing in a toothing of the recess, in particular a vertical longitudinal toothing. This design thus advantageously serves as a guide for the spindle end and not as a driven wheeltooth gear. The guiding can be provided in particular on both sides—left and right—whereas the spindle drive of the longitudinal adjusting is provided, for example, only on one side. Due to the identical guiding means provided on both sides, a high synchronization of the guides can be achieved.

Due to the relatively low effort of the additional guiding means, a very high load capacity and protection against forces in X-direction can be achieved, and jamming can be prevented. The exact shape of the slot in the guiding arm and the guiding of the spindle in the holding device can be adapted to the desired adjusting, as can the positions and shapes of the two guiding arms, resulting in a high degree of design freedom.

According to a preferred embodiment, the adjusting in the vertical direction is also motorized, in particular again as a spindle drive, which is therefore self-locking and thus provides a high level of crash safety and safety against inertial forces.

The vertical adjusting is preferably provided between the holding device and the headrest or a headrest support. Thus, both spindle motors can be received on the holding device and effectively soundproofed from the outside, which offers in particular advantages over alternative solutions with motors in side areas of the headrest.

According to a particularly preferred embodiment, the spindles of both adjustings run vertically or uprightly, so that a space-saving design is achieved, which allows for a compact design of the entire adjusting device, with high safety and low weight. According to a preferred embodiment, the two spindle motors of the adjustings are equal, which allows for a reduced number of parts, and a common control in one interface. Here, for example, the spindles can be of unequal length, e.g. with a longer spindle of the vertical adjusting means and shorter spindle of the longitudinal adjusting means.

The spindle of the longitudinal adjusting means and/or the second spindle of the vertical adjusting means can be flexible, i.e. in particular bendable. This works to particular advantage with the design in which the spindle of the longitudinal adjusting means is loaded by forwards longitudinal adjusting, since the high forces to the front can be absorbed by the flexible spindle as a tensile force, and for the lower forces to the rear the flexible design of the spindle is sufficient to absorb the occurring shear forces.

Accordingly, a vehicle seat is created that provides safe and simple, space-saving, cost-effective and well-silenced motorized adjusting and thus a high comfort.

The invention claimed is:

1. An adjusting device for a headrest of a vehicle seat, the adjusting device comprising:
   a backrest fastening for attaching to a backrest,
   a holding device with a vertical adjustment means for adjusting the headrest in vertical direction,
   a longitudinal adjusting means for adjusting the holding device in a longitudinal direction, the longitudinal adjusting means comprising:
   (1) a four-joint gear provided between the backrest fastening and the holding device, the four-joint gear comprising two guiding arms including a front guiding arm having a cam guiding, the cam guiding being an arc-shaped slot provided in the front-guiding arm, and
   (2) a spindle drive provided between the holding device and the front guiding arm of the four-joint-gear, the spindle drive comprising a spindle motor received in or at the holding device, and a spindle shaft having a spindle head received within the cam guiding, wherein the spindle shaft is translationally displaceable by the spindle motor.

2. The adjusting device of claim 1, wherein the spindle shaft of the longitudinal adjusting means is configured to be pulled and/or tensioned when the holding device is displaced in a longitudinal direction forwards.

3. The adjusting device of claim 2, wherein the spindle shaft is formed from a flexible material.

4. The adjusting device of claim 1, wherein the spindle head of the spindle shaft is further received in a guiding means provided in the holding device, for guiding the spindle head end during the longitudinal adjustment.

5. The adjusting device of claim 4, wherein the four-joint gear comprises two parallel front guiding arms and two parallel rear guiding arms, the spindle drive being attached to only one of the two front arms, and the guiding means being provided in both front arms, for synchronizing the left and right side of the four-joint gear during longitudinal displacement.

6. The adjusting device of claim 4, wherein the guiding means comprises a toothed wheel beared in the spindle head, the toothed wheel comprising a peripheral teeth formation extending on a complete or partial circumference of the toothed wheel and a guiding teeth formation being provided in the holding device, for receiving and meshing with the toothed wheel.

7. The adjusting device of claim 6, wherein the guiding means is formed as a window extending in the holding device in vertical direction.

8. The adjusting device of claim 1, wherein vertical adjustment device is motor-driven and provided between the headrest and the holding device.

9. The adjusting device of claim 8, wherein the motor-driven vertical adjusting device comprises a second spindle motor and a second spindle shaft being translationally displaceable by the second spindle motor.

10. The adjusting device of claim 9, wherein the second spindle motor is received at the holding device and wherein the second spindle shaft is connected to the headrest.

11. The adjusting device of claim 9, wherein the vertical adjusting device and the longitudinal adjusting means comprise an equal spindle motor, preferably with spindle shafts of different lengths.

12. The adjusting device of claim 9, wherein the spindle shaft of the longitudinal adjusting means and/or the second spindle shaft of the vertical adjusting device extend in vertical direction.

13. The adjusting device of claim 1, wherein the longitudinal adjusting means and the vertical adjusting device comprise a common interface at the holding device.

14. The adjusting device of claim 1, wherein the four-joint gear comprises:

at least one front guiding arm being pivotably connected to the backrest fastening in a lower front joint point, and being pivotably connected to the holding device in an upper front joint point, and at least one rear guiding arm being pivotably connected to the backrest fastening in a back lower joint point and being pivotably connected to the holding device in an upper rear joint point, the front guiding arm and the rear guiding arm being of different lengths.

15. A vehicle seat, comprising a backrest, a headrest, and an adjusting device according to claim 1, the backrest fastening of the adjusting device being attached to the backrest and the headrest being vertically displaceable relative to the holding device and the backrest.

\* \* \* \* \*